United States Patent
Nochi et al.

(10) Patent No.: US 9,463,453 B2
(45) Date of Patent: Oct. 11, 2016

(54) METHOD FOR PRODUCING NOX REMOVAL CATALYST FOR HIGH-TEMPERATURE EXHAUST GAS

(75) Inventors: Katsumi Nochi, Minato-ku (JP);
Masanao Yonemura, Minato-ku (JP);
Shuji Fujii, Minato-ku (JP); Kazuhiro Iwamoto, Minato-ku (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/409,071

(22) PCT Filed: Jul. 4, 2012

(86) PCT No.: PCT/JP2012/067059
§ 371 (c)(1),
(2), (4) Date: Dec. 18, 2014

(87) PCT Pub. No.: WO2014/006697
PCT Pub. Date: Jan. 9, 2014

(65) Prior Publication Data
US 2015/0148217 A1    May 28, 2015

(51) Int. Cl.
*B01J 37/00* (2006.01)
*B01J 37/08* (2006.01)
(Continued)

(52) U.S. Cl.
CPC ............ *B01J 37/08* (2013.01); *B01J 21/063* (2013.01); *B01J 21/066* (2013.01); *B01J 23/30* (2013.01); *B01J 27/053* (2013.01); *B01J 35/002* (2013.01); *B01J 35/023* (2013.01); *B01J 37/0201* (2013.01); *B01J 37/0203* (2013.01); *B01J 37/031* (2013.01); *B01D 53/8631* (2013.01);
(Continued)

(58) Field of Classification Search
CPC ...... B01J 21/063; B01J 21/066; B01J 23/30; B01J 27/053; B01J 37/00
USPC .......................... 502/308, 309, 349, 350, 217
See application file for complete search history.

(56) References Cited

U.S. PATENT DOCUMENTS 4,221,768 A * 9/1980 Inoue ................... B01D 53/945
  423/213.2
4,929,586 A * 5/1990 Hegedus ............ B01D 53/8628
  502/217

(Continued)

FOREIGN PATENT DOCUMENTS

JP       58-131135       8/1983
JP       59-26331        6/1984
(Continued)

OTHER PUBLICATIONS

International Search Report issued Aug. 7, 2012 in International (PCT) Application No. PCT/JP2012/067059.
(Continued)

*Primary Examiner* — Patricia L Hailey
(74) *Attorney, Agent, or Firm* — Wenderoth, Lind & Ponack, L.L.P.

(57) ABSTRACT

Provided is a method for producing a NOx removal catalyst for high-temperature exhaust gas, comprising: calcining a mixture comprising $ZrO_2$ and $TiO_2$ with a $ZrO_2$ content ratio of 15% by weight to 55% by weight at 500±15° C. to obtain a composite oxide support; and supporting tungsten oxide on the composite oxide support, followed by calcination at 650±15° C. to obtain a powder catalyst.

4 Claims, 2 Drawing Sheets

(51) Int. Cl.
*B01J 23/30* (2006.01)
*B01J 37/03* (2006.01)
*B01J 21/06* (2006.01)
*B01J 35/00* (2006.01)
*B01J 35/02* (2006.01)
*B01J 37/02* (2006.01)
*B01J 27/053* (2006.01)
*B01D 53/86* (2006.01)

(52) U.S. Cl.
CPC ............ *B01D 2255/20707* (2013.01); *B01D 2255/20715* (2013.01); *B01D 2255/20776* (2013.01); *B01D 2258/0283* (2013.01)

(56) References Cited

U.S. PATENT DOCUMENTS

| | | | |
|---|---|---|---|
| 5,082,820 A | | 1/1992 | Mitsui et al. |
| 5,212,136 A | * | 5/1993 | Angstadt .................. B01J 23/00 502/206 |
| 5,214,017 A | * | 5/1993 | Angstadt ................ B01J 27/053 502/204 |
| 5,310,868 A | * | 5/1994 | Angstadt ................ B01J 27/053 585/721 |
| 8,815,194 B2 | * | 8/2014 | Nochi ................. B01D 53/8628 423/239.1 |
| 2003/0104932 A1 | * | 6/2003 | Kim ..................... B01D 53/945 502/216 |
| 2009/0022643 A1 | * | 1/2009 | Nochi ................. B01D 53/8609 423/244.02 |
| 2010/0209323 A1 | * | 8/2010 | Augustine .......... B01D 53/9418 423/239.1 |
| 2010/0247411 A1 | | 9/2010 | Larcher et al. |

FOREIGN PATENT DOCUMENTS

| | | | | |
|---|---|---|---|---|
| JP | 62-14336 | | 4/1987 | |
| JP | 2-229547 | | 9/1990 | |
| JP | 6-327944 | | 11/1994 | |
| JP | 7-24774 | | 3/1995 | |
| JP | 9-234340 | | 9/1997 | |
| JP | 2825343 | | 9/1998 | |
| JP | 2000-93750 | | 4/2000 | |
| JP | 2004-105964 | | 4/2004 | |
| JP | 2005-81189 | | 3/2005 | |
| JP | 2008-49289 | | 3/2008 | |
| JP | 2010-506713 | | 3/2010 | |
| JP | 4508584 | | 5/2010 | |
| WO | 2011/042953 | * | 4/2011 | ............ B01D 53/94 |

OTHER PUBLICATIONS

Concise explanation of the relevance for JP 58-131135 A issued Aug. 4, 1983.
Concise explanation of the relevance for JP 62-14336 B2 issued Apr. 1, 1987.
Concise explanation of the relevance for JP 59-26331 B2 issued Jun. 26, 1984.
Concise explanation of the relevance for JP 2825343 B2 issued Nov. 18, 1998.
English translation of International Preliminary Report on Patentability and Written Opinion issued Jan. 15, 2015 in PCT/JP2012/067059.

* cited by examiner

METHOD FOR PRODUCING NOX REMOVAL CATALYST FOR HIGH-TEMPERATURE EXHAUST GAS

TECHNICAL FIELD

The present invention relates to a method for producing a NOx removal catalyst for high-temperature exhaust gas.

BACKGROUND ART

The present invention relates to a method for producing a NOx removal catalyst for high-temperature exhaust gas, and more specifically, relates to a method for producing a NOx removal catalyst for high-temperature exhaust gas suitable for reductive removal of nitrogen oxides contained in high-temperature gas emitted from fossil-fuel power plants, gas turbines, and the like.

High temperature combustion exhaust gas emitted from fossil-fuel power plants and gas turbines contains nitrogen oxides. The nitrogen oxides in the exhaust gas have to be removed before the emission of the exhaust gas. In this respect, the nitrogen oxides (NO and $NO_2$) are reductively reacted with a reducing agent to perform a decomposition treatment into harmless nitrogen ($N_2$) and water ($H_2$) by providing a NOx removal apparatus downstream of an combustion device, and injecting the reducing agent into the combustion exhaust gas through an injection nozzle. When a method for removing nitrogen oxides from exhaust gas using a NOx removal catalyst is employed here, ammonia ($NH_3$), urea, or the like is added, in general, because it is necessary to cause sufficient NOx removal reaction.

Conventionally, when a NOx removal catalyst is used for reducing the amount of nitrogen oxides in exhaust gas with ammonia being added as the reducing agent, the treatment is carried out in a high temperature region of 300° C. or above, in general. The NOx removal reaction proceeds according to the following formula (1), where the reaction between 1 mol of NO and 1 mol of $NH_3$ results in decomposition into $N_2$ and $H_2O$.

$$4NH_3 + 4NO + O_2 \rightarrow 4N_2 + 6H_2O \quad (1)$$

However, in the cases of conventionally used catalysts, oxidation reaction of $NH_3$ itself also proceeds at a high temperature of 450° C. or more according to the following formula (2) or (3), in addition to the reaction of the above-described formula (1).

$$2NH_3 + 5/2 O_2 \rightarrow 2NO + 3H_2O \quad (2)$$

$$4NH_3 + 3O_2 \rightarrow 2N_2 + 6H_2O \quad (3)$$

Because of the reaction of the above-described formula (2) or (3), $NH_3$ is not utilized effectively for the reduction of NO, so that the NOx removal performance deteriorates with the elevation of the temperature. Since this causes shortage of the reducing agent, it is difficult to apply the conventional reduction treatment involving the addition of ammonia to, for example, a case of treatment of exhaust gas at 500° C. or above emitted from an outlet of a gas turbine.

Meanwhile, as a method for removing nitrogen oxides at high temperature, a technology using titanium oxide containing a heat resistant inorganic fiber as a support is reported (see Patent Document 1).

However, the catalyst in which tungsten serving as an active component is simply supported on the titanium oxide serving as the support has a limitation in terms of catalytic activity, although the catalyst is optimized based on the mechanical strength of the inorganic filer or the like. Hence, it difficult for the catalyst to efficiently promote the NOx removal reaction.

PRIOR ART DOCUMENTS

Patent Documents

[Patent Document 1] Japanese Patent Application Publication No. Hei 6-327944

[Patent Document 2] Japanese Patent Application Publication No. Hei 2-229547

SUMMARY OF INVENTION

Technical Problems

The present invention has been made in view of the above-described circumstances, and an object of the present invention is to provide a method for producing a NOx removal catalyst for high temperature exhaust gas, which enables a preferred NOx removal catalyst for high-temperature exhaust gas to be obtained by using a composite oxide of $ZrO_2$ and $TiO_2$, and making a control to provide solid acid sites at a desired ratio.

Solution to Problems

The present invention provides a method for producing a NOx removal catalyst for high-temperature exhaust gas, comprising: calcining a mixture comprising $ZrO_2$ and $TiO_2$ with a $ZrO_2$ content ration of 15% by weight to 55% by weight at 500±15° C. to obtain a composite oxide support, and supporting tungsten oxide on the composite oxide support followed by calcination at 650±15° C. to obtain a powder catalyst.

Here, it is also possible to allow sulfate ions to remain on the composite oxide support, and subsequently, support tungsten oxide on the support on which the sulfate ions remain, followed by calcination.

Advantageous Effects of Invention

The present invention provides a method for producing a NOx removal catalyst for high-temperature exhaust gas, which enables a preferred NOx removal catalyst for high-temperature exhaust gas to be obtained by using a composite oxide of $ZrO_2$ and $TiO_2$, and making a control to provide solid acid sites at a desired ratio.

DESCRIPTION OF EMBODIMENTS

Figure 1:
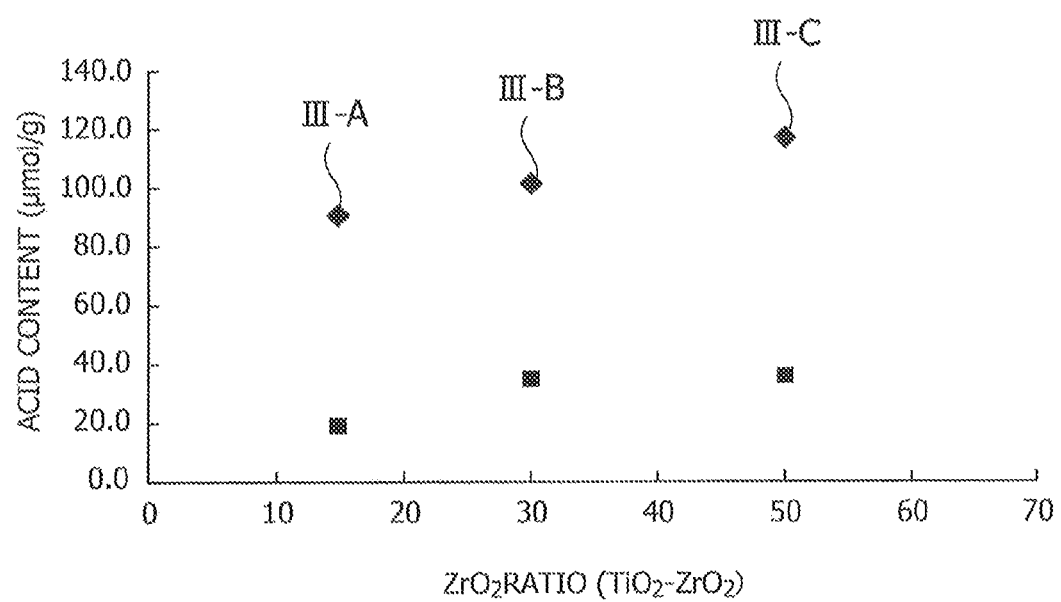
FIG. 1 is a graph showing the solid acid content of NOx removal catalysts III-A, III-B, and III-C for high-temperature exhaust gas obtained in the present invention.

Hereafter, the invention will be described in detail. Note that this invention is not limited to embodiments and examples here. Moreover, constitutional elements in the following embodiments and examples include ones easily conceived of by those skilled in the art, as well as substantially equivalent ones.

A NOx removal catalyst for high-temperature exhaust gas obtained by a production method according to the present invention is a NOx removal catalyst for high-temperature exhaust gas containing nitrogen oxides. In the NOx removal catalyst, tungsten oxide ($WO_3$) is supported on a composite oxide support containing titanium oxide, and preferably the tungsten oxide supported has five $WO_3$ molecular layers or less.

Here, the composite oxide constituting the support is a composite oxide obtained by calcining $ZrO_2$ and $TiO_2$ at high temperature.

In the production method according to the present invention, tungsten oxide ($WO_3$) used as an active component is supported. Preferably, the production method according to the present invention is designed so that tungsten oxide having five tungsten oxide ($WO_3$) molecular layers or fewer can be supported.

Here, the number of molecular layers refers to the thickness of the tungsten oxide ($WO_3$) molecular layers formed on the catalyst support. Particularly when high-temperature NOx removal is continued, the specific surface area of the catalyst support increases. As a result, as shown in Examples and Comparative Examples described later, the number of the molecular layers increases, so that the NOx removal ratio tends to decrease.

In addition, the "the number of $WO_3$ molecular layers" described in the present invention is defined as follows:

"number of molecular layers"="area of $WO_3$ single molecular layer (*1)"[$m^2$/100 g-catalyst]/surface area of catalyst support [$m^2$/100 g-catalyst]

Here, regarding (*1), the "area of $WO_3$ single molecular layer" [$m^2$/100 g-catalyst]=number of moles of $WO_3$ in catalyst" [mol/100 g-catalyst J/number of moles of $WO_3$ single molecular layer (*2) [mol/$cm^2$ of single molecular layer].

Regarding (*2), when the density of tungsten oxide is 7.16 [g/$cm^3$], the molecular weight is 231.8 [g/mol], and the atomic radius of tungsten is 193 [pm], the "number of moles of $WO_3$ single molecular layer"=(7.16/231.8) [number of moles of tungsten oxide per $cm^3$]×193/$10^{10}$ [pm is converted to cm]=5.96e-10

In addition, the amount of tungsten oxide ($WO_3$) supported relative to the entire catalyst is preferably 8% by weight or more and further preferably 12 to 24% by weight relative to the entire weight of the catalyst.

This is because when the ratio exceeds 24% by weight, no effect is observed by further increasing tungsten, and the costs increase.

In addition, the NOx removal catalyst for high-temperature exhaust gas obtained in the present invention may be subjected to a sulfuric acid treatment in order to increase the acid content or acid strength of the catalyst support, thereby suppressing the decomposition of ammonia serving as the reducing agent even in the high-temperature region, and causing the amount of the reducing agent added to effectively act on the catalyst.

This sulfuric acid treatment is, for example, the following treatment method. Specifically, a composite oxide for the support is treated by immersion in sulfuric acid, and then dried. After that, the composite oxide is dried in a heating furnace in a high-temperature atmosphere (for example, 500 to 600° C.). Thus, sulfate ions are allowed to remain as a component in the support.

Next, an example of the method for producing a NOx removal catalyst for high-temperature exhaust gas according to the present invention is described.

First, a mixture comprising $ZrO_2$ and $TiO_2$ is calcined at 600° C. or below (preferably around 5000° C.) to obtain a composite oxide support.

Next, tungsten oxide is supported on the composite oxide support, and they are calcined at a temperature (for example, 650° C.) which is about equal to the operation temperature or which is higher than the operation temperature by about 50° C. Thus, a powder catalyst is obtained.

Here, after the tungsten oxide serving as the active component is supported, the calcination is conducted at a temperature which is about equal to the operation temperature or which is higher than the operation temperature by about 50° C. This is because the calcination at a temperature about equal to the operation temperature makes it possible to prevent cracking and the like of the catalyst due to temperature change.

Here, as a method for producing the composite oxide support, for example, any one of the coprecipitation (CP) method, the homogeneous precipitation (HP) method, and the sol-gel process can be used.

Here, an example of the coprecipitation method is described below. An aqueous titanium chloride ($TiCl_4$) solution and an aqueous zirconium oxychloride solution are mixed with each other at a ratio which will provide a predetermined ratio [$TiO_2$:$ZrO_2$=85 to 450:15 to 55 (weight ratio)]. The temperature is room temperature.

To the aqueous mixture solution, an aqueous ammonia solution is added dropwise until the pH reaches 7. Thus, a coprecipitate slurry is formed.

This slurry is aged by stirring for a predetermined period, and it is then filtered and washed to obtain a cake. The obtained cake is dried at 110° C., and further calcined at 600° C. or below (for example, 500° C.) for a predetermined period to obtain a $TiO_2 \cdot ZrO_2$ composite oxide.

Ammonium paratungstate is dissolved in an aqueous methylamine solution, so that $WO_3$ can be a predetermined ratio (8 parts by weight or higher) relative to 100 parts by weight of the $TiO_2 \cdot ZrO_2$ composite oxide. The solution is dropped on the powdery composite oxide, followed by kneading and drying, repeatedly. Thus, tungsten oxide ($WO_3$) is supported.

The product obtained after the supporting is calcined at a temperature (for example, 650° C.) about equal to the operation temperature for a predetermined period to obtain a powder catalyst.

The obtained powder is immobilized with, for example, a 30-metric ton press-forming machine, and then ground to make the particle diameters, for example, in the range from 2 to 4 mm. Then, the particles are sieved. Thus, the NOx removal catalyst for high-temperature exhaust gas can be obtained.

According to the NOx removal catalyst for high-temperature exhaust gas obtained in the present invention, the number of $WO_3$ molecular layers is preferably 5 or fewer, and further the amount of $WO_3$ supported is 8% by weight or more in terms of the ratio relative to the entire weight of the catalyst. Hence, such effects can be achieved that, even when high-temperature NOx removal is continued with the exhaust gas temperature being 500° C. or above, the adhesion of $WO_3$ to the support can be maintained appropriately, and hence the evaporation can be suppressed, while a high NOx removal performance is retained.

When an exhaust gas treatment is carried out by using the NOx removal catalyst for high-temperature exhaust gas obtained in the present invention, exhaust gas at 500° C. or above, preferably at 600° C. or above is passed through the NOx removal catalyst for high-temperature exhaust gas to decompose and remove the nitrogen oxides in the exhaust gas.

Here, the shape of the NOx removal catalyst is not particularly limited, and for example, a honeycomb shape, a shape in which honeycomb shapes are stacked one on another, a shape in which catalyst particles are packed, or the like may be employed. The catalyst particularly preferably has a honeycomb shape. The size of the honeycomb-shaped catalyst can be determined to be of any size, depending on properties of the exhaust gas, the flow rate thereof, and the like, and is not particularly limited. For example, it is possible to use, for example, a honeycomb-shaped catalyst in which the inlet for the exhaust gas has, for example, an outer shape of 50 to 150 mm square, and whose length L is about 100 to 500 mm.

In a step of a NOx removal treatment using the NOx removal catalyst for high-temperature exhaust gas obtained in the present invention, nitrogen oxides can be removed with the NOx removal catalyst according to the above-described formula (1). In a method for treating exhaust gas emitted from various combustion apparatuses, the emitted exhaust gas is transported to a NOx removal catalyst for high-temperature exhaust gas, where the NOx removal step is conducted. Here, ammonia, urea, or the like is added as a reducing agent upstream of the NOx removal catalyst for high-temperature exhaust gas.

The exhaust gas which can be treated with the NOx removal catalyst for high-temperature exhaust gas obtained in the present invention is not particularly limited, and can be applied to a treatment of exhaust gas containing a nitrogen oxide. Examples of the exhaust gas include boiler exhaust gas from fossil-fuel power plants, factories, and the like in which a fuel such as coal or heavy oil is combusted, and heating furnace exhaust gas from metal factories, petroleum refineries, petrochemical plants, and the like. In particular, the NOx removal catalyst is preferably used for treatment of gas emitted from fossil-fuel power plants and gas turbines.

In the present invention, the mixture comprising $ZrO_2$ and $TiO_2$ with a $ZrO_2$ content ratio of 15% by weight to 55% by weight is calcined to obtain the composite oxide support. Thus, the obtained NOx removal catalyst for high-temperature exhaust gas can secure a solid acid site content of 80.0 μmol/g or more at the initial stage, and 20.0 μmol/g or more even after aging by the calcination at 850° C. for 100 hours. Accordingly, the NOx removal performance at high temperature can be retained for a long period.

EXAMPLES

Hereinafter, Examples demonstrating effects of the present invention are described. However, the present invention is not limited thereto.

Example 1

An aqueous titanium chloride ($TiCl_4$) solution and an aqueous zirconium oxychloride solution were mixed with each other at a ratio which resulted in $TiO_2:ZrO_2=85:15$ (weight ratio). The temperature was room temperature.

To the aqueous mixture solution heated, an aqueous ammonia solution was added dropwise to form a coprecipitate slurry, followed by aging.

This slurry was aged with stirring at 800° C. for 5 hours, and it was then filtered and washed to obtain a cake. The obtained cake was dried at 110° C., and further calcined at 500° C. for 5 hours to obtain a $TiO_2.ZrO_2$ composite oxide. This $TiO_2.ZrO_2$ composite oxide was named composite oxide I-A.

Ammonium paratungstate dissolved in an aqueous methylamine solution in an amount which provided 16 parts by weight of $WO_3$ relative to 100 parts by weight of the composite oxide I-A, and this solution was dropped on the powdery composite oxide, followed by kneading and drying, repeatedly. Thus, tungsten oxide ($WO_3$) was supported.

The product obtained after the supporting was calcined at 650° C. for 3 hours to obtain a powder catalyst II-A. The obtained powder catalyst II was immobilized with a 30-metric ton press-forming machine, and then the immobilized powder was ground to make the particle diameters in the range from 2 to 4 mm. Then, the particles were sieved to obtain a NOx removal catalyst III-A for high-temperature exhaust gas.

Example 2

An aqueous titanium chloride ($TiCl_4$) solution and an aqueous zirconium oxychloride solution were mixed with each other at a ratio which resulted in $TiO_2:ZrO_2=70:30$ (weight ratio). The temperature was room temperature.

To the heated aqueous mixture solution, an aqueous ammonia solution was added dropwise to form a coprecipitate slurry, followed by aging.

This slurry was aged with stirring at 800° C. for 5 hours, and then filtered and washed to obtain a cake. The obtained cake was dried at 110° C., and further calcined at 500° C. for 5 hours to obtain a $TiO_2.ZrO_2$ composite oxide. This $TiO_2.ZrO_2$ composite oxide was named composite oxide I-B.

Ammonium paratungstate was dissolved in an aqueous methylamine solution in an amount which provided 16 parts by weight of $WO_3$ relative to 100 parts by weight of the composite oxide I-B, and this solution was dropped on the powdery composite oxide, followed by kneading and drying, repeatedly. Thus, tungsten oxide ($WO_3$) was supported.

The product obtained after the supporting was calcined at 650° C. for 3 hours to obtain a powder catalyst II-B. The obtained powder catalyst II was immobilized with a 30-metric ton press-forming machine, and then ground to make the particle diameters in the range from 2 to 4 mm. Then, the particles were sieved to obtain a NOx removal catalyst II-B for high-temperature exhaust gas.

Example 3

An aqueous titanium chloride ($TiCl_4$) solution and an aqueous zirconium oxychloride solution were mixed with each other at a ratio which resulted in $TiO_2:ZrO_2=50:50$ (weight ratio). The temperature was room temperature.

To the heated aqueous mixture solution, an aqueous ammonia solution was added dropwise to form a coprecipitate slurry, followed by aging.

This slurry was aged with stirring at 800° C. for 5 hours, and then filtered and washed to obtain a cake. The obtained cake was dried at 110° C., and further calcined at 500° C. for 5 hours to obtain a $TiO_2.ZrO_2$ composite oxide. This $TiO_2.ZrO_2$ composite oxide was named composite oxide I-C.

Ammonium paratungstate was dissolved in an aqueous methylamine solution in an amount which provided 16 parts by weight of $WO_3$ relative to 100 parts by weight of composite oxide I-C, and the solution was dropped on the powdery composite oxide, followed by kneading and drying, repeatedly. Thus, tungsten oxide ($WO_3$) was supported.

The product obtained after the supporting was calcined at 650° C. for 3 hours to obtain a powder catalyst II-C. The obtained powder catalyst II was immobilized, and then ground with a 30-metric ton press-forming machine to make the particle diameters in the range from 2 to 4 mm. Then, the particles were sieved to obtain a NOx removal catalyst III-C for high-temperature exhaust gas.

Example 4

Measurement of Solid Acid Content

Method for Measuring Solid Acid Content

For the measurement of the solid acid content of NOx removal catalysts for high-temperature exhaust gas, the pyridine temperature programmed desorption (TPD) method was employed. The conditions for measuring the solid acid content were as described below. Under the measurement conditions, pyridine was adsorbed until saturation, and the amount of pyridine desorbed was employed as the acid content.
Sample weight: 6.3 mg
Pretreatment: 450° C., 0.5 h, He purge
Adsorption condition: 150° C.
Desorption condition: The temperature was raised from 150° C. to 800° C. at 30° C./min The carrier gas was He.
Detector: FID
FIG. 1 shows the results.

The plotted rhombuses of the larger solid acid contents are those of the NOx removal catalysts III-A, III-B, and III-C for high temperature exhaust gas at the initial stage, respectively. The plotted squares are those of the NOx removal catalysts III-A, III-B, and III-C for high-temperature exhaust gas, respectively, after aging by calcination at 850° C. for 100 hours.

Each of the catalysts retained a solid acid content of 80.0 µmol/g or higher at the initial stage, and 20.0 µmol/g or higher even after the aging by calcination at 850° C. for 100 hours.

Example 3

Exhaust Gas Treatment Test

NOx Removal Catalysts III-A and III-C for High-Temperature Exhaust Gas

Conditions for evaluating the NOx removal activity were as follows.
NO: 65 ppm, $O_2$: 14%, $NH_3$: 51.3 ppm, $CO_2$: 4.8%, $H_2O$: 8.8%, $N_2$: the balance, AV: 22.2 $Nm^3/m^2$ hr.
Note that
the NOx removal ratio is represented by the following formula:

NOx removal ratio (%)=(1−outlet NOx concentration/inlet NOx concentration)×100

Figure 2:
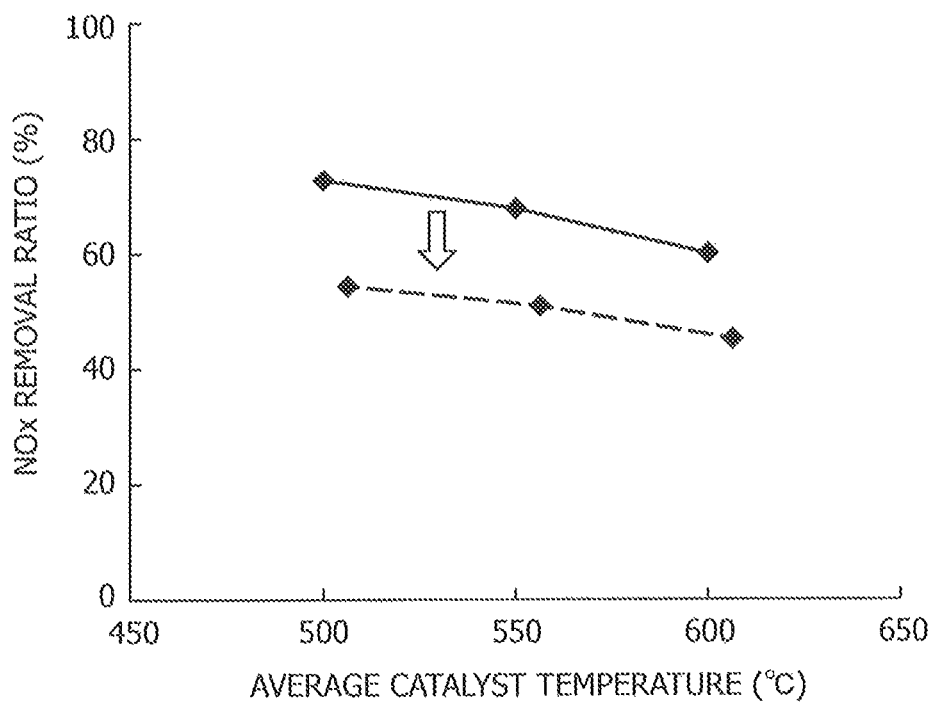
FIG. 2 is a graph showing the catalytic activity of the NOx removal catalyst III-A for high-temperature exhaust gas obtained in the present invention.
Figure 3:
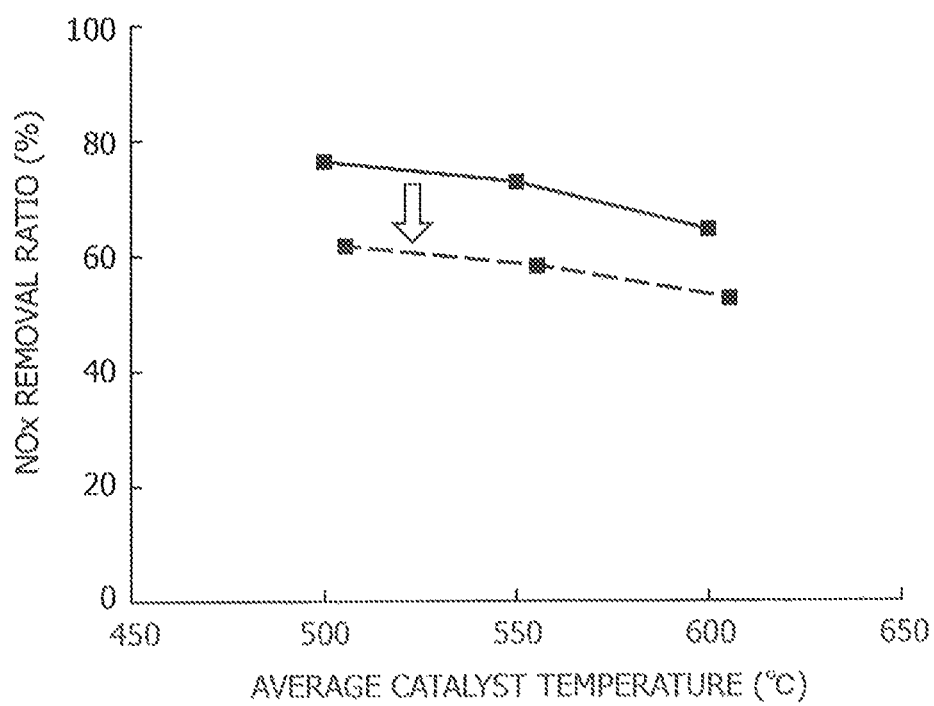
FIG. 3 is a graph showing the catalytic activity of the NOx removal catalyst III-C for high-temperature exhaust gas obtained in the present invention.

The results are shown in FIG. 2 (the NOx removal catalyst III-A for high-temperature exhaust gas) and FIG. 3 (the NOx removal catalyst III-C for high-temperature exhaust gas).

The upper represents the catalytic activity at the initial stage, and the lower represents the results after application of a load of 800° C. for 15 hours.

Good performance was exhibited from 500 to 600° C., and the performance did not deteriorate excessively after the application of the load.

These characteristics are obtainable because the NOx removal catalyst for high-temperature exhaust gas obtained in the present invention has a sufficient solid acid content.

INDUSTRIAL APPLICABILITY

As described above, the NOx removal catalyst for high-temperature exhaust gas obtained by the production method according to the present invention is particularly suitable for reductive removal of nitrogen oxides contained in high-temperature gas emitted from Fossil-fuel power plants, high-temperature boiler, and the like.

The invention claimed is:
1. A method for producing a NOx removal catalyst for high-temperature exhaust gas, comprising:
calcining a mixture comprising $ZrO_2$ and $TiO_2$ with a $ZrO_2$ content ratio of 15% by weight to 55% by weight at 500±15° C. to obtain a composite oxide support;
treating the composite oxide support by immersion in sulfuric acid to produce sulfate ions which are allowed to remain on the composite oxide support; and
supporting tungsten oxide on the composite oxide support, followed by calcination at 650±15° C. to obtain a powder NOx removal catalyst for high-temperature exhaust gas,
wherein the obtained NOx removal catalyst for high-temperature exhaust gas secures a solid acid site content of 80.0 µmol/g or more at an initial stage, and
wherein the mixture comprising $ZrO_2$ and $TiO_2$ comprises a weight ratio of $ZrO_2$:$TiO_2$ of 85:15.

2. The method for producing the NOx removal catalyst for high-temperature exhaust gas according to claim 1, wherein the obtained NOx removal catalyst for high-temperature exhaust gas further secures a solid acid site content of 20.0 µmol/g or more after aging by the calcination at 850° C. for 100 hours.

3. A method for producing a NOx removal catalyst for high-temperature exhaust gas, comprising:
calcining a mixture comprising $ZrO_2$ and $TiO_2$ with a $ZrO_2$ content ratio of 15% by weight to 55% by weight at 500±15° C. to obtain a composite oxide support;
treating the composite oxide support by immersion in sulfuric acid to produce sulfate ions which are allowed to remain on the composite oxide support; and
supporting tungsten oxide on the composite oxide support, followed by calcination at 650±15° C. to obtain a powder NOx removal catalyst for high-temperature exhaust gas,
wherein the obtained NOx removal catalyst for high-temperature exhaust gas secures a solid acid site content of 80.0 µmol/g or more at an initial stage, and
wherein the mixture comprising $ZrO_2$ and $TiO_2$ comprises a weight ratio of $ZrO_2$:$TiO_2$ of 70:30.

4. The method for producing the NOx removal catalyst for high-temperature exhaust gas according to claim 3, wherein the obtained NOx removal catalyst for high-temperature exhaust gas further secures a solid acid site content of 20.0 µmol/g or more after aging by the calcination at 850° C. for 100 hours.

* * * * *